United States Patent [19]

Kaminsky et al.

[11] Patent Number: 4,933,403

[45] Date of Patent: Jun. 12, 1990

[54] PROCESS FOR THE PREPARATION OF OPTICALLY ACTIVE POLYOLEFINS

[75] Inventors: Walter Kaminsky, Pinneberg; Stefan Niedoba, Hamburg, both of Fed. Rep. of Germany

[73] Assignee: Hoechst Aktiengesellschaft, Frankfurt am Main, Fed. Rep. of Germany

[21] Appl. No.: 838,678

[22] Filed: Mar. 11, 1986

[30] Foreign Application Priority Data

Mar. 13, 1985 [DE] Fed. Rep. of Germany ....... 3508887

[51] Int. Cl.$^5$ .......................... C08F 4/66; C08F 10/04
[52] U.S. Cl. .................................. 526/160; 502/117; 526/348.6; 526/351
[58] Field of Search ......................................... 526/160

[56] References Cited

U.S. PATENT DOCUMENTS

| | | | |
|---|---|---|---|
| 3,193,544 | 7/1965 | Natta et al. | 526/159 |
| 3,197,452 | 7/1965 | Natta et al. | 526/351 |
| 4,522,982 | 6/1985 | Ewen | 526/160 |

FOREIGN PATENT DOCUMENTS

| | | |
|---|---|---|
| 0007061 | 5/1983 | European Pat. Off. . |
| 0129368 | 1/1984 | European Pat. Off. . |
| 129368 | 12/1984 | European Pat. Off. . |
| 2230672 | 12/1972 | Fed. Rep. of Germany . |
| 3007725 | 9/1981 | Fed. Rep. of Germany . |
| 3127133 | 1/1983 | Fed. Rep. of Germany . |

OTHER PUBLICATIONS

Mechanisms of Stereochemical Control in Propylene Polymerizations with Soluble Group 4B Metallocene/Methylalumoxane Catalysts, John A. Ewen, J. Am. Chem. Soc., 106, 6355–6364 (1984).

Synthesis and Molecular Structures of Chiral Ansa-Titanocene Derivatives with Bridged Tetrahydroindenyl Ligands, Ferdinand R. W. P. Wild et al, Journal of Organometallic Chemistry, 232 (1982), 233–247.

*Primary Examiner*—Edward J. Smith

[57] ABSTRACT

Process for the preparation of optically active polyolefins by polymerizing olefins of the formula $CH_2=CHR$ in which $R=C_1C_{10}$-alkyl in the presence of an optically active catalyst system composed of an optically active transition metal compound containing only enantiomer (R- or S-form) of a stereorigid, chiral transition metal compound and an aluminum-containing compound of the aluminoxane type.

7 Claims, No Drawings

PROCESS FOR THE PREPARATION OF OPTICALLY ACTIVE POLYOLEFINS

The present invention relates to a process for the preparation of optically active polyolefins by polymerizing propylene and higher 1-olefins using new Ziegler catalyst systems. The invention relates, in particular, to a process for the preparation of optically active polypropylene, wherein the polymerization is carried out in the presence of a catalyst system composed of an optically active enantiomer of a stereorigid, chiral transition metal compound and an aluminum alkyl compound containing oxygen.

As is known, isotactic polypropylene is prepared with the aid of so-called supported catalyst systems. These are mixed catalysts in which, for example, a titanium compound and, in order to increase the isotacticity, an electron donor are deposited onto a magnesium halide, and in which aluminum alkyls are employed as activators. Catalysts of this type are described, for example, in German Offenlegungsschrift No. 2,230,672 and in European Patent No. 7,061. These active catalyst systems are characterized by a high degree of isotacticity. The active centers of the catalyst fixed on the support are in this case arranged in a chiral manner by the firmly fixed ligands.

In the known isotactic polypropylenes equal proportions of both enantiomers (racemates) are present.

Soluble Ziegler catalysts are also known. Thus processes for the preparation of polyolefins which are carried out using bis-(cyclopentadienyl)-zirconium alkyl or bis-(cyclo- pentadienyl)-zirconium halogen compounds in combination with oligomeric aluminumoxanes are described, for example, in German Offenlegungsschrift No. 3,007,725 and German Offenlegungsschrift No. 3,127,133. Although these soluble catalyst systems display a very high activity in the polymerization of ethylene and propylene, in the case of propylene polymerization the product contains predominant proportions of atactic material. Isotactic polypropylene is only obtained by using catalysts having sterically large radicals on the transition metal or by using stereorigid, chiral zirconium compounds in combination with methyl aluminoxane (J. A. Ewen, J. Am. Chem. Soc. 106 (1984) 6355; European Published Specification No. 129,368).

It has now been found that polymers which are optically active and exhibit a high degree of isotacticity are obtained when propylene and other higher 1-olefins are polymerized in the presence of a catalyst system composed of (a) an optically active transition metal compound which is composed only of one enantiomer (R- or S-form) of a stereorigid and chiral transition metal compound of the 4th to 6th sub-group, preferably a titanium or zirconium compound, and which corresponds to the general formula $R^1Me(2A)R^2R^3$, and (b) an aluminum-containing compound of the aluminoxane type of the general formulae $$Al_2OR_4{}^5(Al(R^5)-O)_n$$

for a linear aluminoxane, and $$(Al(R^5)-O-)_{n+2}$$

for a cyclic aluminoxane, n being 4 to 20 and $R^5$ being methyl or ethyl.

In addition, the catalyst systems are exceptionally active. The optically active, stereorigid, chiral transition metal compound of the catalyst system to be employed in the process according to the invention comprises π-linked, unsymmetrical, mononuclear or polynuclear compounds which are bridged by hydrocarbon chains and preferably contain titanium or zirconium as the transition metal and correspond to the following general structural formula

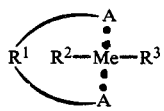

In this formula

Me denotes a transition metal of the 4th to 6th sub-group, such as titanium, zirconium, vanadium, chromium, molybdenum or tungsten, preferably titanium or zirconium and especially zirconium;

A denotes a mononuclear or polynuclear, unsymmetrical hydrocarbon radical, preferably an indenyl group or a substituted cyclopentadienyl group, especially 4,5,6,7-tetrahydro-1-indenyl;

$R^1$ denotes a $C_1$ to $C_4$ hydrocarbon radical, preferably a $C_2H_4$ hydrocarbon radical; and $R^2$ and $R^3$ denote halogen, preferably chlorine, or a $C_1$ to $C_6$-alkyl radical, $R^2$ and $R^3$ being identical or different.

The R- or S-forms of ethylene-bis-(4,5,6,7-tetrahydro-1-indenyl)-zirconium dichloride or of ethylene-bis-(4,5,6,7-tetrahydro-1-indenyl)-titanium dichloride, particularly those of ethylene-bis-(4,5,6,7-tetrahydro-1-indenyl)zirconium dichloride, are preferred.

The optically active transition metal compounds are employed in a particular case as the pure R-form or S-form. They are prepared by known processes which are described, for example, in the Journal of Organometallic Chemistry, 232 (1982) 233–247.

Aluminoxanes of the general formulae $$Al_2OR_4{}^5(Al(R^5)-O)_n \text{ for a linear aluminoxane}$$

and $$(Al(R^5)-O-)_{n+2} \text{ for a cyclic aluminoxane,}$$

in which n is an integer from 4 to 20 and $R^5$ is a methyl or ethyl radical, preferably a methyl radical, are used as the organoaluminum catalyst component. The preparation of compounds of this type is known. It is important that the aluminoxane should have a degree of polymerization of at least 6; preferably it is over 10.

Monomers employed in the preparation of homopolymers are olefins of the formula $CH_2=CHR$ in which R is $C_1$ to $C_{10}$-alkyl. It is preferable to use propene or 1-butene.

The polymerization can be carried out in solvents, in the liquid monomers or in the gas phase. When polymerization is carried out in solvents, it is advantageous to use aluminoxane concentrations of $10^{-4}$ to $10^{-1}$ mole per liter and to use the aluminum and transition metal components in a molar ratio of 10:1 to $10^8$:1.

The polymerization is carried out at temperatures within the range from $-80°$ to $100°$ C., but preferably at $-40$ to $80°$ C., the range between $-20°$ and $60°$ C. being particularly preferred.

The average molecular weight of the polymers formed can be controlled in a manner known per se by adding hydrogen and/or by varying the temperature. The molecular weight is adjusted to higher values at low temperatures and to lower values at higher temperatures.

The polyolefins obtained by the process according to the invention, especially polypropylenes and polybutenes, are distinguished by optical activity. The polyolefin is found to have an optical rotation if the polymer is dissolved in decahydronaphthalene by means of an ultrasonic bath and is examined in a commercially available polarimeter (Perkin Elmer 241). Values of the rotation $[\alpha]^T$ between 50° and 200° are found, depending on the amount of polymer and the aging time, $[\alpha]^T$ being defined as the measured value of $\alpha \times 100/m_{PV}$.

The measured value of $\alpha$ denotes the angle of rotation measured; $m_{P.V}$ denotes grams of polymer per 100 cm$^3$ of decahydronaphthalene.

No analogous optically active polypropylenes or polybutylenes have hitherto been described. It is extremely surprising that it has been possible to prepare polymers of this type at all. Like known polyolefins, the polyolefins according to the invention can be processed by thermoplastic means, for example to give shaped articles such as fibers and films.

The optically active polypropylene according to the invention is distinguished by having a melting point which is 7° to 10° C. higher than that of an optically inactive product which has been prepared under identical conditions using the racemate of the chiral transition metal compound.

The polyolefins obtained by the process according to the invention are also distinguished by having a very high degree of isotacticity, the fraction soluble in heptane being less than 1%. 99% by weight or more of the polypropylene obtained by the process according to the invention is isotactic polypropylene.

EXAMPLE 1

(a) Preparation of methyl aluminoxane 44.3 g of Al$_2$(SO$_4$)$_3$.16 H$_2$O (0.056 mole, corresponding to 1 mole of H$_2$O) were suspended in 250 ml of toluene, 50 ml of trimethylaluminum (0.52 mole) were added, and the mixture was allowed to react at 20° C. After a reaction time of 30 hours approx. 0.9 mole of methane had been evolved. The solution was then freed from solid aluminum sulfate by filtration. Removal of the toluene gave 19.7 g of methyl aluminoxane. The yield was 63% of theory. The average molecular weight, determined cryoscopically in benzene, was 1,170.

The average degree of oligomerization was approx. 16.

(b) Preparation of optically active R-(rotation+270°)ethylene-bis-(4,5,6,7-tetrahydroindenyl)-zirconium dichloride The preparation was carried out analogously to the method described in the Journal of Organometallic Chemistry, 232 (1982), 233-247 on pages 245-247 for ethylene-bis-(4,5,6,7-tetrahydroindenyl)-titanium dichloride.

(c) Polymerization

A 1 liter glass autoclave which had been cleansed by heating and flushed several times with argon was charged, while thermostatically controlled at −10° C., with 330 ml of absolute toluene, 360 mg of methyl aluminoxane having an average degree of oligomerization of 16 and 1.2×10$^{-6}$ mole of R-ethylene-bis-(4,5,6,7-tetrahydroindenyl)-zirconium dichloride. 70 ml of propene were rapidly condensed into this solution, the mixture becoming cloudy after a few minutes. After a polymerization time of 2 hours the temperature was raised to 18° C. and the polymerization was continued for a further 13 hours. The pressure was approx. 2.5 bar. The polymerization was then terminated by blowing off the excess monomer and adding ethanol. Residues of catalyst were removed by stirring with HCl solution, and the polymer was then filtered off with suction and dried at 40° C. to constant weight. The yield of optically active, pulverulent, isotactic polypropylene was 33.5 g; the activity was thus 1,860 kg of PP/mole of Zrxh, at an $M_n$ of 45,000.

The rotation was determined by suspending 20 mg of the polymer in 2 ml of decalin and then dissolving it substantially by means of an ultrasonic bath. After the solution had been transferred into a 10 cm cell, a rotation of −90° was determined in an automatically compensating polarimeter using the Na D line.

EXAMPLE 2

The procedure was as in Example 1, but polymerization was carried out at a temperature of 10° C. 24.5 g of optically active polypropylene were obtained after a polymerization time of 16 hours. The activity was 1,280 kg of PP/mole of Zrxh. The rotation was −150°.

EXAMPLE 3

The procedure was as in Example 1, but only 270 mg of methyl aluminoxane in 250 ml of toluene were initially taken. 2×10$^{-6}$ mole of the R-zirconium compound and 48 g of 1-butene were metered in. Polymerization was carried out for 15 hours at a temperature of 15° C.

The yield of optically active, crystalline polybutene was 0.2 g. Calculation gives an activity of 6.8 kg of PB/mole of Zrxh. The optical rotation of the polybutene was determined as +100°.

We claim:

1. A process for the preparation of optically active polyolefins by polymerizing olefins of the formula CH$_2$=CHR in which R=C$_1$-C$_{10}$-alkyl in solvents, liquid monomers or the gas phase at temperatures between −50 and 100° C. by means of a soluble transition metal compound and an aluminoxane, which comprises carrying out the polymerization in the presence of an optically active catalyst system consisting essentially of the following components (a) an optically active transition metal compound containing only one enantiomer (R- or S-form) of a stereorigid, chiral transition metal compound of the formula

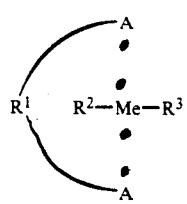

in which $R^1$ is a $C_1$ to $C_4$ hydrocarbon radical, Me is a transition metal of the 4th to 6th sub-group and A is a mononuclear or polynuclear, unsymmetrical hydrocarbon radical and $R^2$ and $R^3$ are halogen or a $C_1$ to $C_6$ alkyl radical, it being possible for $R^2$ and $R^3$ to be identical or different, and (b) an aluminum-containing compound of the aluminoxane type of the formulae $$Al_2OR_4^5(Al(R^5)-O)_n$$

for a linear aluminoxane and $$(Al(R^5)-O)_{n+2}$$

for a cyclic aluminoxane, in which n is a number from 4 to 20 and $R^5$ is a methyl or ethyl radical.

2. The process as claimed in claim 1, wherein the transition metal compound used is an optically active titanium or zirconium compound.

3. The process as claimed in claim 1, wherein the unsymmetrical hydrocarbon radicals A are indenyl or substituted cyclopentadienyl radicals.

4. The process as claimed in claim 1, wherein the polymerization is carried out in the presence of a catalyst composed of S-ethylene-bis-(4,5,6,7-tetrahydroindenyl)zirconium dichloride or R-ethylene-bis-(4,5,6,7-tetrahydroindenyl)-zirconium dichloride and methyl aluminoxane.

5. A process for the preparation of optically active polyolefins by polymerizing propene or 1-butene in solvents, liquid monomers or the gas phase at temperatures between $-50°$ and $100°$ C. by means of a soluble transition metal compound and an aluminoxane, which comprises carrying out the polymerization in the presence of an optically active catalyst system consisting essentially of the following components (a) an optically active transition metal compound containing only one enantiomer (R- or S-form) of a stereorigid, chiral transition metal compound of the formula

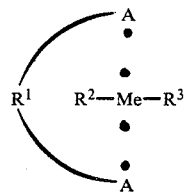

in which $R^1$ is a $C_1$ to $C_4$ hydrocarbon radical, Me is a transition metal of the 4th to 6th sub-group and A is a mononuclear or polynuclear, unsymmetrical hydrocarbon radical and $R^2$ and $R^3$ are halogen or a $C_1$ to $C_6$ alkyl radical, it being possible for $R^2$ and $R^3$ to be identical or different, and (b) an aluminum-containing compound of the aluminoxane type of the formulae $$Al_2OR_4^5(Al(R^5)-O)_n$$

for a linear aluminoxane and $$(Al(R^5)-O)_{n+2}$$

for a cyclic aluminoxane, in which n is a number from 4 to 20 and $R^5$ is a methyl or ethyl radical; the optically active olefin polymer produced by this process, when dissolved in decahydronaphthalene, having an optical rotation, $[\alpha]^T$, between $50°$ and $200°$, $[\alpha]^T$ being defined as the measured value of $\alpha$ times 100 divided by the number of grams of polymer per 100 $cm^3$ of decahydronaphthalene.

6. An optically active polyolefin obtained by the process of claim 5.

7. An optically active substantially isotactic polypropylene obtained by the process of claim 5, said polypropylene having the said optical rotation and a melting point which is $7°$ to $10°$ C. higher than that of an optically inactive polypropylene prepared under conditions identical to said process except that the transition metal compound of said component (a) is a racemate instead of a single enantiomer.

* * * * *